(12) United States Patent
Grutter et al.

(10) Patent No.: US 10,300,918 B2
(45) Date of Patent: May 28, 2019

(54) VEHICLE TRACTION AND ALL-WHEEL DRIVE CONTROL SYSTEM

(71) Applicant: FORD GLOBAL TECHNOLOGIES, LLC, Dearborn, MI (US)

(72) Inventors: Peter John Grutter, Dearborn, MI (US); Andreas Evangelos Perakes, Canton, MI (US); Nicholas Edward McCubbin, Northville, MI (US); Paul Moubarak, Redford Township, MI (US); Dan Fratila, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 15/360,677

(22) Filed: Nov. 23, 2016

(65) Prior Publication Data
US 2018/0141558 A1  May 24, 2018

(51) Int. Cl.
*B60W 10/18* (2012.01)
*B60K 23/08* (2006.01)
(Continued)

(52) U.S. Cl.
CPC ..... *B60W 30/18172* (2013.01); *B60K 17/344* (2013.01); *B60K 17/35* (2013.01); *B60K 17/3515* (2013.01); *B60K 23/08* (2013.01); *B60K 23/0808* (2013.01); *B60W 10/02* (2013.01); *B60W 10/06* (2013.01); *B60W 10/184* (2013.01); *B60K 2023/085* (2013.01); *B60K 2023/0858* (2013.01); *B60W 2510/0208* (2013.01); *B60W 2520/263* (2013.01);
(Continued)

(58) Field of Classification Search
CPC ... B60W 30/18172; B60W 2510/0208; B60W 2710/021; B60W 2710/0666; B60W 2720/30; B60W 10/02; B60W 2520/263; B60W 10/184; B60W 10/06; B60K 23/0808; B60K 17/3515; B60K 17/35; B60K 17/344; B60K 23/08; B60K 2023/0858; B60K 2023/085; B60Y 2400/82; B60Y 2300/18175; B60Y 2300/73; B60Y 2300/429
See application file for complete search history.

(56) References Cited

U.S. PATENT DOCUMENTS 6,319,173 B1 * 11/2001 Patel ..................... B60W 10/02
477/176
7,072,756 B2   7/2006 Matsuda
(Continued)

FOREIGN PATENT DOCUMENTS

GB          2522442 A      7/2015

*Primary Examiner* — Charles A Fox
*Assistant Examiner* — Lillian T Nguyen
(74) *Attorney, Agent, or Firm* — David Kelley; Brooks Kushman, P.C.

(57) ABSTRACT

A vehicle includes a first axle, second axle, first clutch, second clutch, and controller. The first and second axles are coupled by a driveshaft. The first and second clutches are configured to isolate the driveshaft from loads transferred through the first and second axles, respectively, when open. The controller is programmed to, in response to a difference between output speeds of the first and second axles exceeding a first threshold, close the second clutch, reduce the difference such that it is below a second threshold, and close the first clutch.

16 Claims, 3 Drawing Sheets

(51) Int. Cl.
   *B60W 30/18* (2012.01)
   *B60K 17/344* (2006.01)
   *B60W 10/02* (2006.01)
   *B60W 10/06* (2006.01)
   *B60W 10/184* (2012.01)
   *B60K 17/35* (2006.01)

(52) U.S. Cl.
   CPC ............... *B60W 2710/021* (2013.01); *B60W 2710/0666* (2013.01); *B60W 2720/263* (2013.01); *B60W 2720/30* (2013.01); *B60Y 2300/18175* (2013.01); *B60Y 2300/429* (2013.01); *B60Y 2300/73* (2013.01); *B60Y 2400/82* (2013.01)

(56) References Cited

U.S. PATENT DOCUMENTS

| | | | |
|---|---|---|---|
| 8,979,694 B2 * | 3/2015 | Holmes | B60W 20/40 475/5 |
| 2004/0049332 A1 | 3/2004 | Doh | |
| 2014/0046564 A1 | 2/2014 | Matsuno | |
| 2015/0175148 A1 | 6/2015 | Chimner et al. | |

* cited by examiner

VEHICLE TRACTION AND ALL-WHEEL DRIVE CONTROL SYSTEM

TECHNICAL FIELD

The present disclosure relates to vehicles, vehicle traction control systems, and vehicle all-wheel drive control systems.

BACKGROUND

Vehicles may include traction control and all-wheel drive systems that are designed to improve vehicle mobility, stability, and predictability.

SUMMARY

A vehicle includes a first axle, second axle, first clutch, second clutch, and controller. The first and second axles are coupled by a driveshaft. The first and second clutches are configured to isolate the driveshaft from loads transferred through the first and second axles, respectively, when open. The controller is programmed to, in response to a difference between output speeds of the first and second axles exceeding a first threshold, close the second clutch, reduce the difference such that it is below a second threshold, and close the first clutch.

A vehicle includes a first axle, second axle, driveshaft, and controller. The first axle has a first differential and first clutch. The first differential includes first and second output shafts that are each coupled to one of a pair of first wheels. The second axle has a second differential that includes third and fourth output shafts that are each coupled to one of a pair of second wheels and a second clutch. The second clutch is configured to decouple one of the pair of second wheels from the fourth output shaft when in an open position. The driveshaft is selectively coupled to a carrier of the first differential by the first clutch and is coupled to a carrier of the second differential via a fixed gearing arrangement. The controller is programmed to, in response to a difference between a speed of the first pair of wheels and a speed of the second pairs of wheels exceeding a first threshold while the first and second clutches are in opened positions, close the second clutch. The controller is also programmed to, in response to closing the second clutch, reduce the difference to a value that is less than a second threshold. The controller is further programmed to, in response to reducing the difference to a value that is less than the second threshold, close the first clutch.

A method includes, in response to a speed difference between output speeds of first and second axles of a vehicle exceeding a first threshold, closing a first clutch to couple a traction wheel to an output of the first axle, reducing the difference to a value that is less than a second threshold, and closing a second clutch to couple an input of the first axle to an output of the second axle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
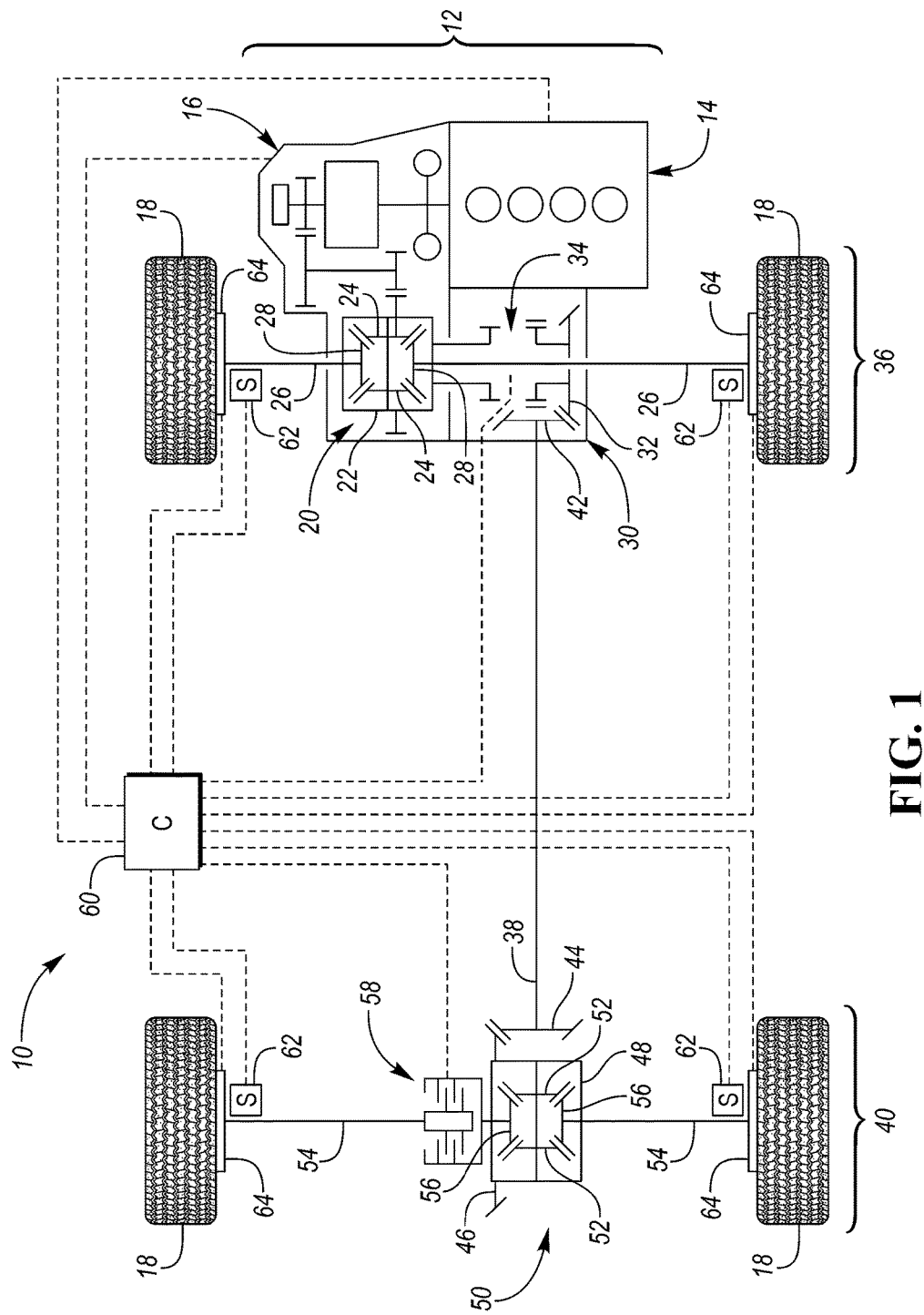
FIG. 1 is a schematic illustration of a representative vehicle and a representative vehicle powertrain.

Referring to FIG. 1, a schematic diagram representative of a vehicle 10 and a vehicle powertrain 12 is illustrated. The vehicle 10 may be an all-wheel-drive (AWD) vehicle where the powertrain 12 is capable of delivering power to all of the vehicle's wheels, whether full-time or on-demand. The powertrain 12 includes prime movers or power generating components (i.e., engines or electric motors) and the drivetrain. The drivetrain is the group of components that deliver power to the drive wheels, excluding the power generating components. In contrast, the powertrain 12 is considered to include both the power generating components and the drivetrain. The powertrain 12 includes an engine 14 and a transmission 16. The powertrain 12 may alternatively, or in addition to the engine 14, include an electric motor as a prime mover. If an electric motor is used as an alternative to the engine 14 it should be construed to perform all the functions of the engine 14 as described herein. The transmission 16 may include gearing arrangements configured to provide multiple gear ratios between an input and an output of the transmission 16. The engine 14 is connected to the input of the transmission 16 while drivetrain components that are configured to deliver power to drive wheels 18 are connected to outputs of the transmission 16. The engine 14 may be connected to the input of the transmission by a torque converter or a launch clutch.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a fixed component, such as a transmission housing, may be called a brake.

The transmission 16 may be a transaxle that includes both gearing elements that provide multiple gear ratios between an input and an output of the transmission 16 and a differential, which may be referred to as the front axle differential 20. The front axle differential 20 may comprise the output of the transmission 16. The front axle differential 20 includes a carrier 22, spider (or bevel) gears 24 that are rotatably coupled to the carrier 22, and output (or half) shafts 26 that include bevel gears 28 that mesh with the spider gears 24. The output shafts 26 are each fixedly coupled to a drive wheel 18. The vehicle 10 may also include a power transfer unit (PTU) 30. The PTU 30 may also be referred to as a power takeoff unit. The PTU 30 may include a ring gear 32 that is selectively coupled to the carrier 22 by power transfer unit clutch (PTU clutch) 34. The PTU clutch 34 may be a dog clutch. Collectively, the front axle differential 20 (including the carrier 22, spider gears 24, output shafts 26, bevel gears 28, etc.) and the PTU 30 (including the ring gear 32 and PTU clutch 34) may be referred to as the front axle 36. The front axle 36 may or may not also include the drive wheels 18 that are fixedly coupled to the output shafts 26. The output shafts 26 and the carrier 22 may all act as outputs of the front axle 36. The engine 14 (or other prime mover) may be configured to generate and transfer power and/or torque to the front axle 36.

A driveshaft 38 may be configured to couple the front axle 36 to a rear axle 40. More specifically, the driveshaft 38 may include a first bevel gear 42 that meshes with the ring gear 32 in the PTU 30 and a second bevel gear 44 that meshes with a ring gear 46 that is affixed to a carrier 48 of a rear axle differential 50. The rear axle differential 50 also includes spider (or bevel) gears 52 that are rotatably coupled to the carrier 48, and output (or half) shafts 54 that include bevel gears 56 that mesh with the spider gears 52. The output shafts 54 are each fixedly coupled to a drive wheel 18. One of the half shafts 54 includes a rear drive unit (RDU) clutch 58 that is configured to couple and decouple one of the drive wheels 18 from the rear axle differential 50. Collectively, the rear axle differential 50 (including the ring gear 46, carrier 48, spider gears 52, output shafts 54, bevel gears 56, etc.) and the RDU clutch 58 may be referred to as the rear axle 40. The rear axle 40 may or may not also include the drive wheels 18 that are fixedly coupled to the output shafts 54. Collectively, the rear axle differential 50 (including the ring gear 46, carrier 48, spider gears 52, output shafts 54, bevel gears 56, etc.) and the RDU clutch 58, excluding the drive wheels 18, may be referred to as the rear drive unit (RDU). When the PTU clutch 34 and the RDU clutch 58 are both in closed positions power and/or torque that is generated by the engine 14 is transferred from the front axle 36 to the rear axle 40 via the driveshaft 38.

The front axle 36 may be referred to as the first axle while the rear axle 40 is referred to as the second axle, or vice versa. The front axle differential 20 may be referred to as the first differential while the rear axle differential 50 is referred to as the second differential, or vice versa. The carrier 22, spider gears 24, and bevel gears 28 of the front axle differential 20 may be referred to as the first carrier, first set of spider gears, and first set of bevel gears, respectively, while the carrier 48, spider gears 52, and bevel gears 56 of the rear axle differential 50 may be referred to as the second carrier, second set of spider gears, and second set of bevel gears, respectively, or vice versa. The output (or half) shafts 26 of the front axle differential 20 may be referred to as the first and second output (or half) shafts while the output (or half) shafts 54 of the rear axle differential 50 may be referred to as the third and fourth output (or half) shafts, or vice versa. The RDU clutch 58 may be referred to as the first clutch while the PTU clutch 34 may be referred to as the second clutch, or vice versa.

When the PTU clutch 34 and the RDU clutch 58 are both in open positions such that the ring gear 32 is decoupled from the carrier 22 and one of the drive wheels is decoupled from the rear axle differential 50, parasitic losses within the driveline may be decreased because specific components will cease rotating. Specifically, when the PTU clutch 34 and the RDU clutch 58 are both in open positions the ring gear 32, driveshaft 38 and carrier 48 of the rear axle differential 50 will all cease to rotate decreasing parasitic losses and increasing the overall fuel economy of the vehicle 10.

The vehicle 10 further includes an associated controller 60 such as a powertrain control unit (PCU). While illustrated as one controller, the controller 60 may be part of a larger control system and may be controlled by various other controllers throughout the vehicle 10, such as a vehicle system controller (VSC). It should therefore be understood that the controller 60 and one or more other controllers can collectively be referred to as a "controller" that controls various actuators in response to signals from various sensors to control functions of various components.

The controller 60 may be configured to receive signals indicative of the wheel speed of each individual drive wheel 18. The controller 60 may receive the signals from speed sensors 62 that are configured to determine the rotational speed of each individual drive wheel 18. The controller 60 may include an algorithm that is configured to convert the rotational speed of each individual drive wheel 18 into linear speed.

The controller 60 may be configured to control the power, torque, and/or speed output of the engine 14 (or other prime movers such as electric motors in electric or hybrid vehicles) based on an accelerator and/or a brake pedal input or any other state or condition that may require an adjustment of the power, torque, and/or speed output of the engine 14 (or other prime mover). The controller 60 may further be configured to control various functions of the transmission 16, such as shifting, based on various inputs including accelerator and/or brake pedal input, a regenerative braking request (in vehicles that include electric generators configured to recharge a battery), other operator inputs (such as changing the position of a transmission gear selector), etc.

The controller 60 may be configured to control friction brakes 64 (or actuators thereof) based on input from the brake pedal or another state or condition of the vehicle 10 that may require breaking. Additionally, the controller 60 may be configured to control the PTU clutch 34 (or actuators thereof) and the RDU clutch 58 (or actuators thereof). Actuators may include electric motors, electric solenoids, valves connected to hydraulic cylinders, valves connected to pneumatic cylinders, or any other actuator known in the art. More specifically, the controller 60 maybe configured to open both the PTU clutch 34 and the RDU clutch 58 based on a need to decrease parasitic losses and increased fuel economy. Alternatively, the controller 60 may be configured to close both the PTU clutch 34 and the RDU clutch 58 based on a need to provide power to the drive wheels 18 of both the front axle 36 and rear axle 40.

The controller 60 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 14 or vehicle 10.

Control logic or functions performed by the controller 60 may be represented by flow charts, graphs, or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, transmission, transaxle, and/or powertrain controller, such as controller 60. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 60 may be configured to receive various states or conditions of the various vehicle components illustrated in FIG. 1 via electrical signals. The electrical signals may be delivered to the controller 60 from the various components via input channels. Additionally, the electrical signals received from the various components may be indicative of a request or a command to change or alter a state of one or more of the respective components of the vehicle 10. The controller 60 includes output channels that are configured to deliver requests or commands (via electrical signals) to the various vehicle components. The controller 60 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described in FIG. 1 is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
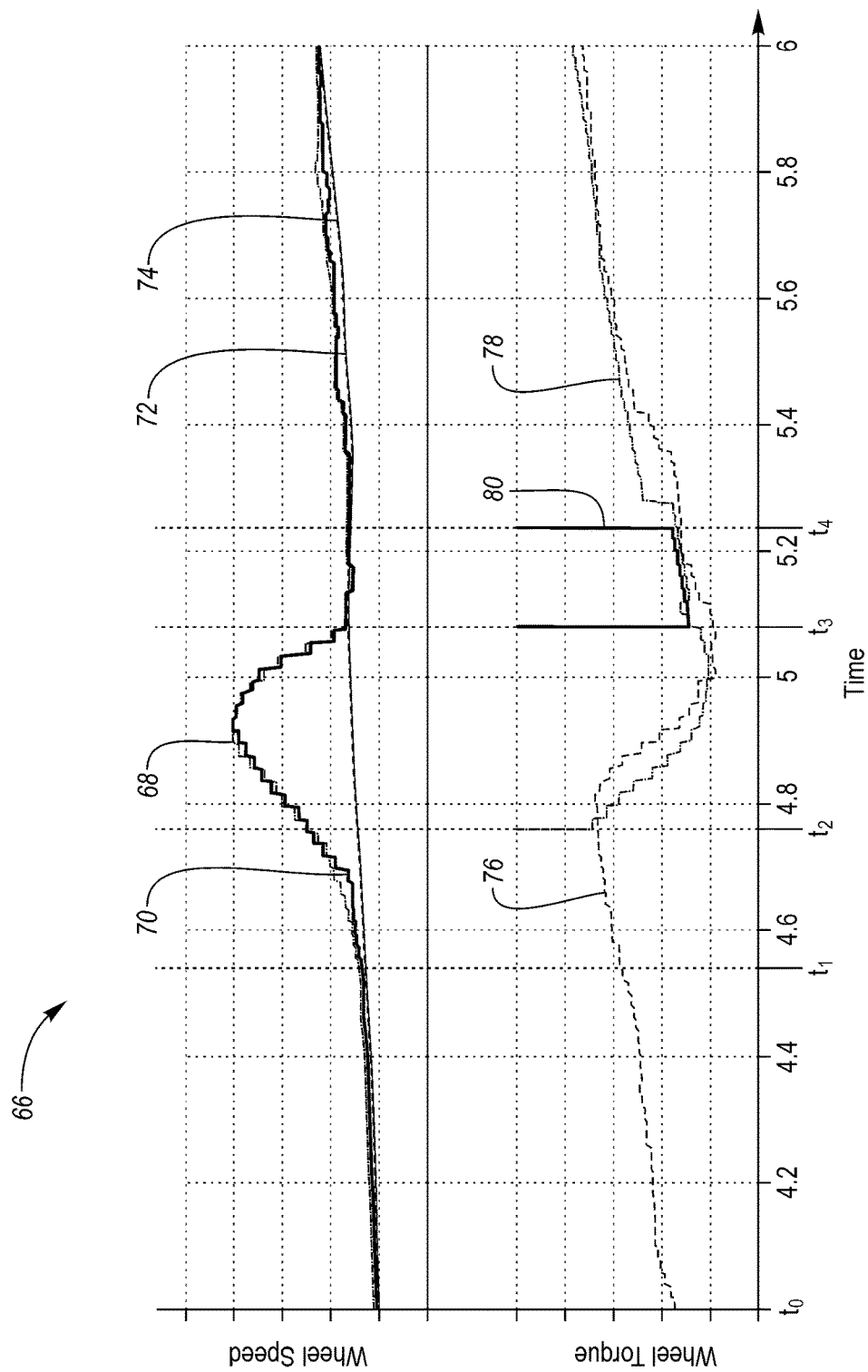
FIG. 2 is a graph illustrating the speeds and the output torque of the drive wheels of the vehicle.

Referring to FIG. 2, a graph 66 including the speeds and the output torque of the drive wheels 18 during an example engagement of the RDU clutch 58 and the PTU clutch 34 is illustrated. Line 68 and line 70 depict the speeds of the front right drive wheel and front left drive wheel that both are connected to the front axle 36, respectively. Line 72 and line 74 depict the speeds of the rear right drive wheel and rear left drive wheel that are both connected to the rear axle 40, respectively. All of the speeds shown may represent either the rotational speed or linear speed of the individual drive wheel. Line 76 depicts the output torque of the drive wheels 18. The output torque of the drive wheels 18 may only include the torque delivered to the drive wheels 18 on the front axle 36 when the PTU clutch 34 and the RDU clutch 58 are both in open positions. The output torque of the drive wheels 18 may include the drive wheels 18 on the both the front axle 36 and the rear axle 40 when the PTU clutch 34 and the RDU clutch 58 are both in closed positions. Line 78 depicts a torque limit imposed on the output torque of the drive wheels 18 by a traction control system of the vehicle 10 when the vehicle 10 is transitioning from a condition where both the PTU clutch 34 and the RDU clutch 58 are opened to a condition where both the PTU clutch 34 and the RDU clutch 58 are closed. Line 80 depicts a torque limit imposed on the output of the drive wheels 18 during engagement of the PTU clutch 34.

From time $t_0$ to time $t_1$, both the PTU clutch 34 and the RDU clutch 58 are in an open position in order to decrease the parasitic losses as described above. The torque of the drive wheels 18 increases between time $t_0$ and time $t_1$. The speed differential, however, between the front drive wheels (i.e., the front right drive wheel and the front left drive wheel) and the rear drive wheels (i.e., the rear right drive wheel and rear left drive wheel) remains at zero or near zero indicating that there is no or negligible wheel slip between the front drive wheels and the rear drive wheels. At time $t_1$, the speed differential between the front drive wheels in the rear drive wheels begins to increase indicating an undesirable amount of wheel slip. More specifically, the speed of the front drive wheels begins to increase to a value that is greater than the speed of the rear drive wheels. After time $t_1$, the RDU clutch 58 will close causing the carrier 48 of the rear axle differential 50 and the driveshaft 38 to begin rotating. Also after time $t_1$, and more specifically at time $t_2$, the traction control system, via the torque limit imposed by the traction control system 78, will begin to reduce the output torque to the wheels 76. More specifically, after time $t_2$ the control actions imposed by the traction control system, which may consist of powertrain torque reduction via the engine 14 or other prime mover, and/or an application of one or more of the friction brakes 64, will begin to reduce the output torque to one or both of the front drive wheels since the PTU clutch 34 is still in an open position preventing torque from being transferred from the front axle 36 to the rear axle 40. Between times $t_2$ and $t_3$, the rotational speeds of the carrier 48 of the rear axle differential 50 and the driveshaft 38 will begin to increase due to the closing of the RDU clutch 58 while the speeds of the front drive wheels may begin to decrease due to the control actions imposed by the traction control, which may include the torque limit imposed by the traction control system 78.

At time $t_3$, the speed difference between the front drive wheels and the rear drive wheels begins to approach a small or zero difference indicating that the rotational speed difference between the opposing sides of the PTU clutch 34 is small enough to allow PTU clutch 34 to begin closing without causing noise, vibration, or harshness (NVH) issues or damage to any of the rotating parts. The speed difference between the front drive wheels and the rear drive wheels may range between 0 and 4 kilometers per hour, which correlates to rotational speed difference between the opposing sides of the PTU clutch 34 that ranges between 0 and 30 RPMs. Between times $t_3$ and $t_4$ the PTU clutch 34 transitions from the open position to the closed position. Also during the time span from $t_3$ to $t_4$, the ongoing control actions of the traction control system, which may include the torque limit imposed on the output of the drive wheels 80, prevents significant wheels slip from returning during engagement of the PTU clutch 34. At the end of the time span from $t_3$ to $t_4$, the powertrain 12 of the vehicle 10 fully transitions into an AWD mode that delivers power and torque to all four of the drive wheels. Once in the AWD mode, from time $t_4$ and on, the traction control system is no longer acting to facilitate a PTU clutch 34 connect event, and transitions to an AWD mode of operation that provides an optimal AWD system function. After time $t_4$, the torque limit imposed on the output of the drive wheels 80 is removed. Also after time $t_4$, a small amount of slip may occur according to the AWD mode of operation.

Figure 3:
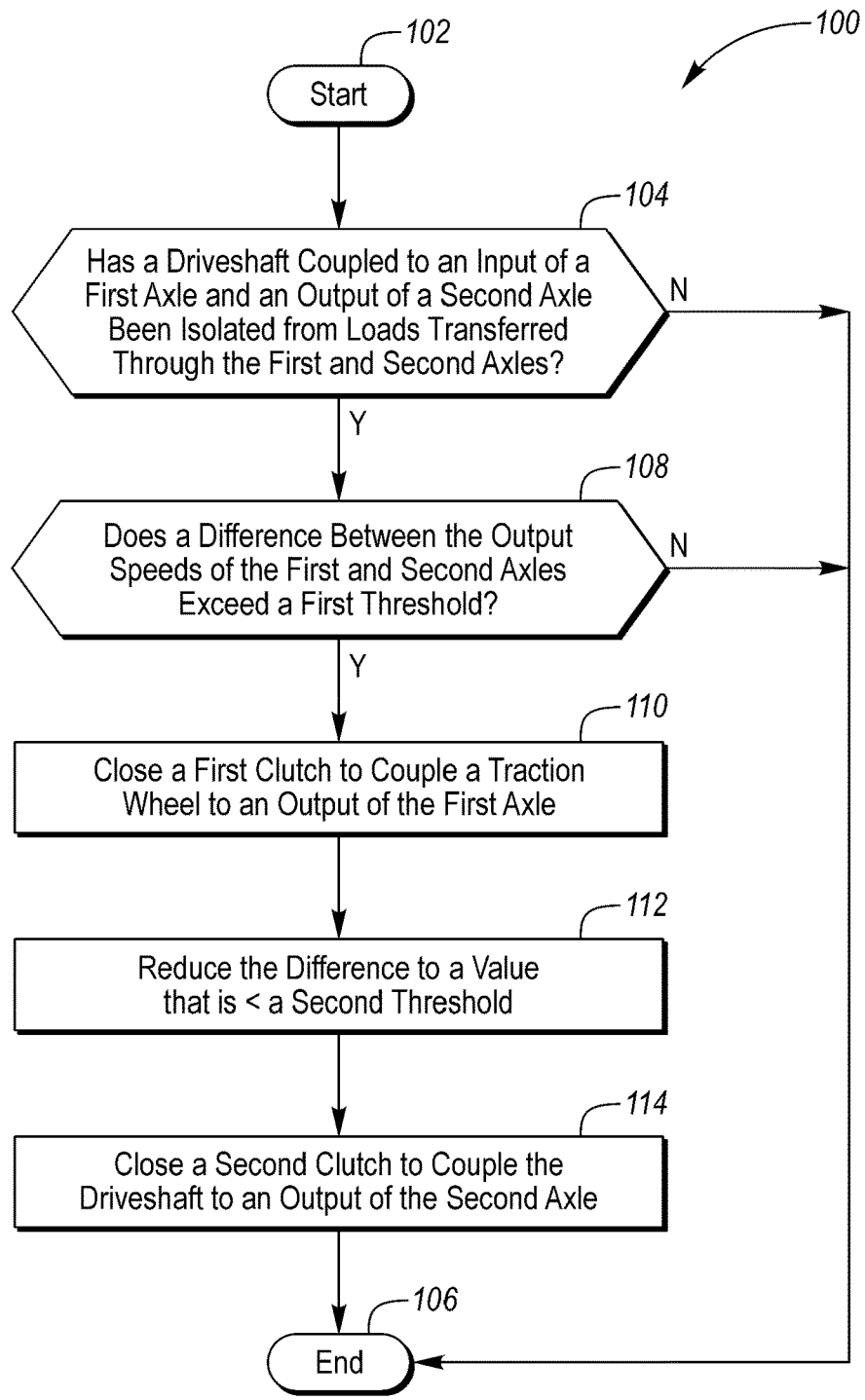
FIG. 3 is method of controlling the powertrain of the vehicle.

Referring to FIG. 3 a method 100 of controlling the powertrain 12 of the vehicle 10 is illustrated. The method 100 may be configured to control the powertrain 12 according to the graph in FIG. 2. The method 100 may be stored as an algorithm and/or control logic within the controller 60. The controller 60 may be configured to implement the method 100 by sending electrical signals to various components (or actuators thereof) of the vehicle 10 via output channels in response to receiving electrical signals from various components of the vehicle 10 via input channels.

The method 100 is initiated at start block 102. Once the method has been initiated, the method moves on to block 104 where it is determined if a driveshaft (i.e., the driveshaft 38) that is coupled to an input (i.e., the carrier 48 of the rear axle differential 50) of a first axle (i.e., the rear axle 40) and the output (i.e., the carrier 22 of the front axle differential 20 or the ring gear 32) of a second axle (i.e., the front axle 36) has been isolated from loads transferred through the first and second axles. The driveshaft may be decoupled from the first and second axles when the PTU clutch 34 and RDU clutch 58 are in opened conditions as described above. If the driveshaft has not been isolated from loads transferred through the first and second axles, the method ends at block 106. If the driveshaft has been isolated from loads transferred through the first and second axles, the method moves on to block 108.

At block 108, it is determined if the difference between the output speeds of the first and second axles exceeds a first threshold. The speed of the first axle may correlate to either the rotational or linear speeds of the output shafts 54 or the drive wheels 18 of the rear axle 40. The speed of the first axle maybe the average rotational or linear speed of the two output shafts 54 of the rear axle 40. Alternatively, the speed of the first axle may be the average rotational or linear speed of the two drive wheels 18 of the rear axle 40. The speed of the second axle may correlate to either the rotational or linear speeds of the output shafts 26 or the drive wheels 18 of the front axle 36. The speed of the second axle maybe the average rotational or linear speed of the two output shafts 26 of the front axle 36. Alternatively, the speed of the second axle may be the average rotational or linear speed of the two drive wheels 18 of the front axle 36. If the difference between the output speeds of the first and second axles does not exceed the first threshold, the method ends at block 106. If the difference between the output speeds of the first and second axles does exceed the first threshold, the method moves on to block 110.

At block 110, a first clutch (i.e., the RDU clutch 58) is closed to couple a traction wheel 18 to an output of the rear axle 40. When the RDU clutch is closed, the RDU clutch 58 may couple the traction wheel 18 to the output of the rear axle 40 (or output of the rear axle differential 50) by coupling two separate shafts that comprise a single output shaft 54 of the rear axle 40. When the RDU clutch 58 is open, the RDU clutch 58 may decouple the traction wheel 18 from the output of the rear axle 40 by decoupling the two separate shafts that comprise the single output shaft 54 of the rear axle 40. Upon closing the RDU clutch 58, the carrier 48 of the rear axle differential 50 and the driveshaft 38 will begin to rotate, as described above.

Next, the method moves on to block 112 where the difference between the output speeds of the first axle and the second axle is reduced to a value that is less than a second threshold. The speed difference between the first axle and the second axle being less than the second threshold correlates to a rotational speed difference between the opposing sides of the PTU clutch 34 being small enough to allow the PTU clutch 34 to close without causing NVH issues or damage to any of the rotating parts as described above. The difference between the output speeds of the first axle and the second axle may be reduced by reducing the torque to the output shafts or drive wheels of the second axle (i.e., the front axle 36). The torque reduction may be accomplished through engine 14 or other prime mover, an application of the friction brakes 64, or a combination thereof.

Once the difference between the output speeds of the first axle and the second axle is reduced to a value that is less than the second threshold, the method moves on to block 114 where a second clutch (i.e., the PTU clutch 34) is closed to couple the driveshaft (i.e., the driveshaft 38) to an output of the second axle (i.e., the carrier 22 of the front axle differential 20 or the ring gear 32). Once the second clutch is closed, the torque applied to the first and second axles (i.e. the output shafts and/or drive wheels of the first and second axles) by the engine 14 (or other prime mover) may be increased. Upon completion of block 114, the vehicle may be in an AWD mode as described above and the PTU clutch 34 and RDU clutch 58 may be each controlled such that the difference between the output speeds of the first axle in the second axle remain within a predetermined range.

It should be understood that the flowchart in FIG. 3 is for illustrative purposes only and that the method 100 should not be construed as limited to the flowchart in FIG. 3. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
first and second axles coupled by a driveshaft;
first and second clutches configured to isolate the driveshaft from loads transferred through the first and second axles, respectively, when open;
a prime mover configured to transfer torque to the first axle, wherein the first axle transfers torque to the second axle via the driveshaft when the first and second clutches are in closed positions; and
a controller programmed to, in response to a difference between output speeds of the first and second axles exceeding a first threshold, close the second clutch, reduce the difference by reducing a torque output of the first axle, via decreasing the torque of the prime mover, such that the difference is below a second threshold, and close the first clutch.

2. The vehicle of claim 1, further comprising friction brakes, and wherein the controller is programmed to reduce the speed difference by reducing a torque output of the first axle by applying the friction brakes to output shafts of the first axle.

3. The vehicle of claim 1, wherein the output speed of the first axle is based on an average speed of two output shafts of the first axle and the output speed of the second axle is based on an average speed of two output shafts of the second axle.

4. The vehicle of claim 1, wherein the controller is programmed to, in response to closing the first clutch, increase the torque output of the first and second axles.

5. The vehicle of claim 1, wherein the first axle has a first differential having first carrier, the second axle has a second differential having a second carrier, and the driveshaft is coupled to first and second carriers.

6. The vehicle of claim 5, wherein the first clutch selectively couples the driveshaft to the first carrier.

7. The vehicle of claim 6, further comprising a traction wheel, and wherein the second clutch selectively couples an output shaft of the second differential to a traction wheel.

8. A vehicle comprising:
a first axle having a first differential and first clutch, the first differential including first and second output shafts each coupled to one of a pair of first wheels;
a second axle having a second differential that includes third and fourth output shafts each coupled to one of a pair of second wheels, and a second clutch configured to decouple one of the pair of second wheels from the fourth output shaft when in an open position;
a driveshaft selectively coupled to a carrier of the first differential by the first clutch and coupled to a carrier of the second differential via a fixed gearing arrangement;
a prime mover configured to transfer torque to the first axle, wherein the first axle transfers torque to the second axle via the driveshaft when the first and second clutches are in closed positions; and
a controller programmed to,
in response to a difference between a speed of the first pair of wheels and a speed of the second pairs of wheels exceeding a first threshold while the first and second clutches are in opened positions, close the second clutch,
in response to closing the second clutch, reduce the difference to a value that is less than a second threshold by reducing a torque output of the first axle via decreasing the torque of the prime mover, and
in response to reducing the difference to the value that is less than the second threshold, close the first clutch.

9. The vehicle of claim 8, further comprising friction brakes, and wherein the controller is programmed to reduce the speed difference by reducing a torque output of the first axle by applying the friction brakes to the first pair of wheels.

10. The vehicle of claim 8, wherein the speed of the first pair of wheels is based on an average speed of two wheels that comprise the first pair wheels and the speed of the second pair of wheels is based on an average speed of two wheels that comprise the second pair of wheels.

11. The vehicle of claim 8, wherein the controller is programmed to, in response to closing the first clutch, increase the torque to the first axle.

12. The vehicle of claim 11, wherein the controller is programmed to, in response to closing the first clutch and increasing the torque to the first axle, control the first and second clutches such that the difference remains within a predetermined range.

13. A method comprising:
in response to a speed difference between output speeds of first and second axles of a vehicle exceeding a first threshold,
closing a first clutch to couple a traction wheel to an output of the first axle,
reducing the difference to a value that is less than a second threshold by reducing a torque output of the second axle via decreasing torque of a prime mover that is configured to transfer torque to the second axle, and
closing a second clutch to couple an input of the first axle to an output of the second axle.

14. The method of claim 13, further comprising decreasing a torque output of the first axle in response to the difference exceeding the first threshold.

15. The method of claim 13, further comprising increasing torque outputs of the first and second axles in response to closing the second clutch.

16. The method of claim 13, wherein the output speed of the first axle is based on an average speed of two output shafts of the first axle and the output speed of the second axle is based on an average speed of two output shafts of the second axle.

* * * * *